(12) United States Patent
Devlin et al.

(10) Patent No.: US 10,929,993 B2
(45) Date of Patent: Feb. 23, 2021

(54) AUTOMATED IMAGING SYSTEM FOR EVALUATING THE CURL OF A KERATINOUS SUBSTRATE

(71) Applicant: L'OREAL, Paris (FR)

(72) Inventors: Matthew Devlin, Clark, NJ (US); Christopher Pang, Clark, NJ (US); Waibhav Tembe, Clark, NJ (US)

(73) Assignee: L'OREAL, Paris (FR)

( * ) Notice: Subject to any disclaimer, the term of this patent is extended or adjusted under 35 U.S.C. 154(b) by 41 days.

(21) Appl. No.: 15/721,221

(22) Filed: Sep. 29, 2017

(65) Prior Publication Data
US 2019/0102894 A1  Apr. 4, 2019

(51) Int. Cl.
| | | |
|---|---|---|
| *G06T 7/50* | (2017.01) | |
| *G06T 7/73* | (2017.01) | |
| *G06T 7/90* | (2017.01) | |
| *G06T 7/11* | (2017.01) | |
| *G06T 7/136* | (2017.01) | |
| *G06T 7/60* | (2017.01) | |
| *G06K 9/00* | (2006.01) | |
| *G06K 9/46* | (2006.01) | |
| *G06K 9/62* | (2006.01) | |

(52) U.S. Cl.
CPC ............ *G06T 7/50* (2017.01); *G06K 9/00362* (2013.01); *G06T 7/11* (2017.01); *G06T 7/136* (2017.01); *G06T 7/60* (2013.01); *G06T 7/73* (2017.01); *G06T 7/90* (2017.01); *G06K 9/4604* (2013.01); *G06K 9/4652* (2013.01); *G06K 9/6202* (2013.01); *G06T 2207/10024* (2013.01); *G06T 2207/20081* (2013.01); *G06T 2207/20084* (2013.01); *G06T 2207/20132* (2013.01); *G06T 2207/30124* (2013.01); *G06T 2210/22* (2013.01)

(58) Field of Classification Search
CPC ............ G06K 9/00248; G06K 9/0061; G06K 9/00221; G06K 9/00281; G06T 7/50; G06T 7/73; G06T 7/90; G06T 7/11; G06T 7/136; G06T 7/60
See application file for complete search history.

(56) References Cited

U.S. PATENT DOCUMENTS

| | | | | |
|---|---|---|---|---|
| 2004/0050400 A1* | 3/2004 | Takahashi | ............ | A45D 44/005 132/218 |
| 2005/0175650 A1* | 8/2005 | Hadasch | .................. | A61Q 1/12 424/401 |
| 2011/0164816 A1* | 7/2011 | Guo | .................... | G06K 9/00241 382/165 |

(Continued)

FOREIGN PATENT DOCUMENTS

| | | |
|---|---|---|
| CN | 105654047 A | 6/2016 |
| CN | 105931179 A | 9/2016 |

(Continued)

*Primary Examiner* — Kenny A Cese
(74) *Attorney, Agent, or Firm* — Oblon, McClelland, Maier & Neustadt, L.L.P.

(57) ABSTRACT

A system is provided for evaluating a curl of at least one eyelash sample that includes a plurality of fibers, comprising: a platform configured to receive a sample of the eyelash sample; an image capturing device configured to capture profile image of the eyelash ample; and a processing system configured to receive the profile image and evaluate at least one feature related to a curl of one or more of the fibers of at least one eyelash sample.

12 Claims, 11 Drawing Sheets

(56) References Cited

U.S. PATENT DOCUMENTS

| | | | | |
|---|---|---|---|---|
| 2015/0201692 | A1* | 7/2015 | Hansen | A41G 5/02 |
| | | | | 132/201 |
| 2015/0326570 | A1* | 11/2015 | Publicover | H04N 5/247 |
| | | | | 726/4 |
| 2016/0232444 | A1 | 8/2016 | Fan et al. | |
| 2016/0256377 | A1* | 9/2016 | Bui | A61Q 1/10 |
| 2018/0276883 | A1* | 9/2018 | D'Alessandro | G06T 17/20 |
| 2018/0300581 | A1* | 10/2018 | Iftikhar | G06K 9/32 |

FOREIGN PATENT DOCUMENTS

| | | |
|---|---|---|
| DE | 197 34 735 A1 | 2/1999 |
| DE | 198 32 967 C1 | 4/2000 |
| JP | 03-010366 | 1/1991 |

\* cited by examiner

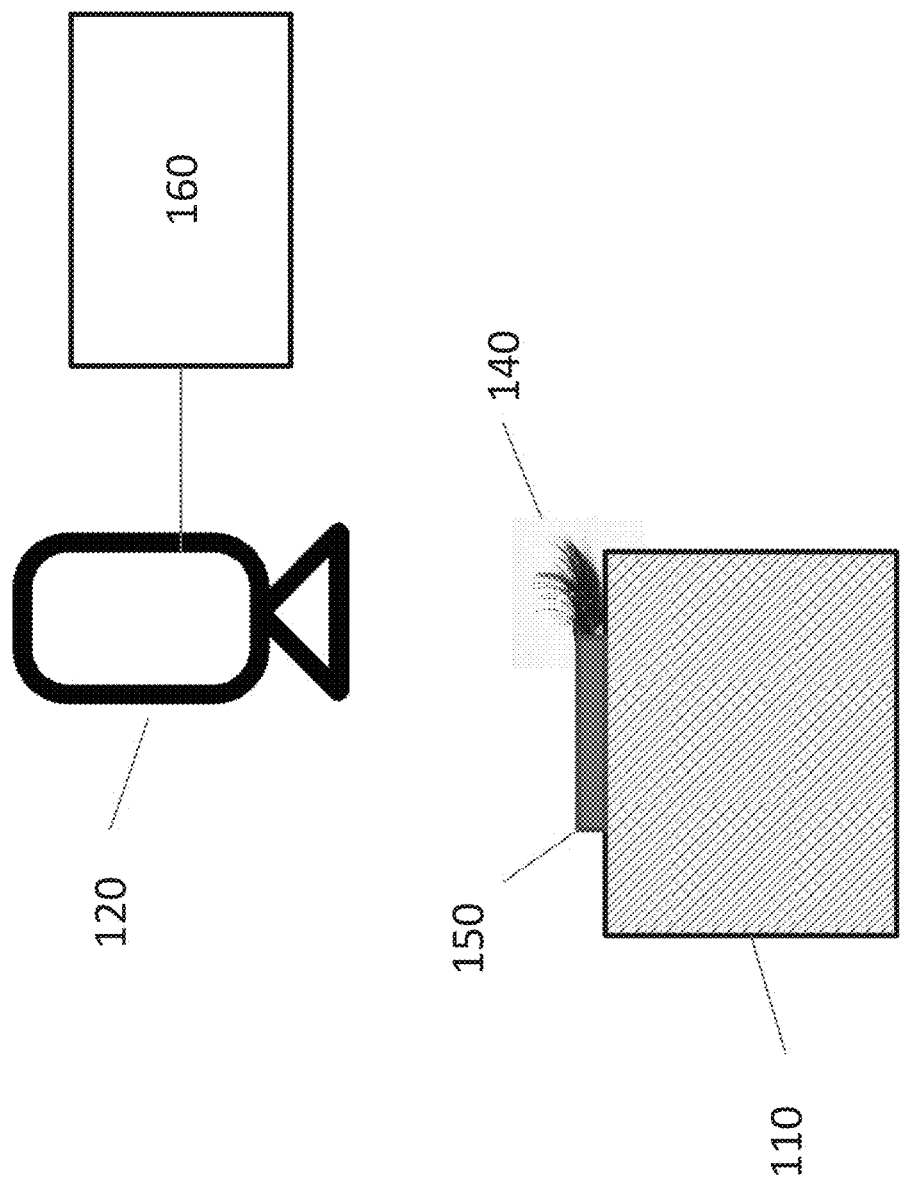

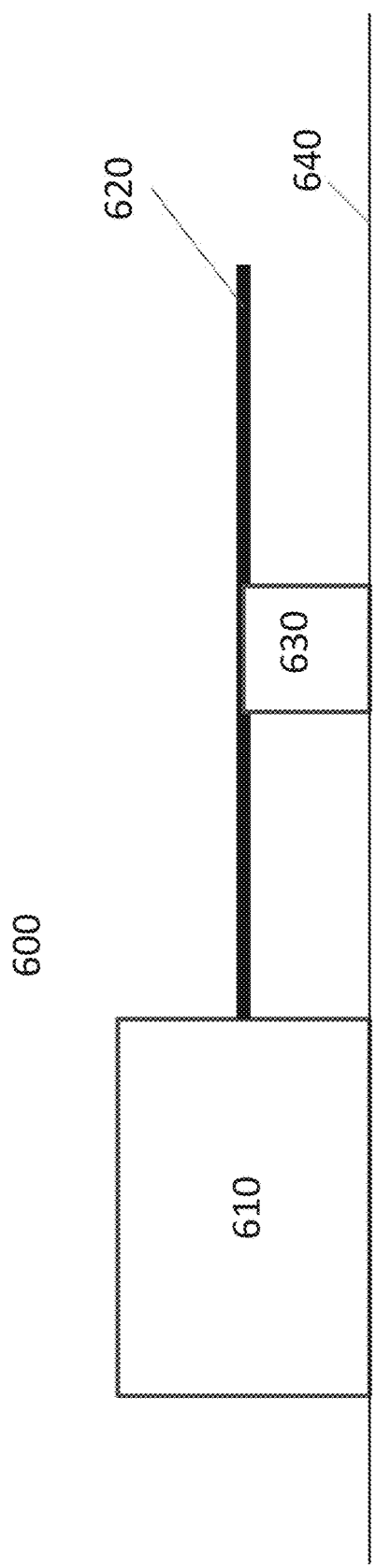
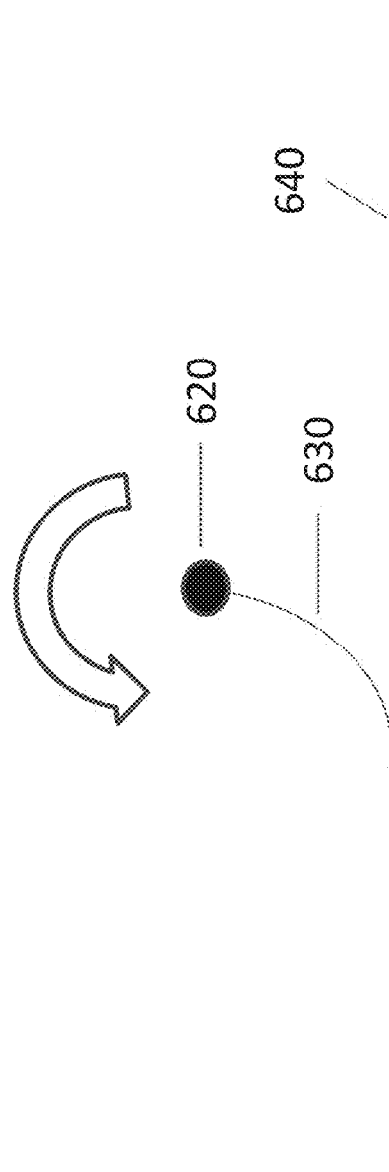

AUTOMATED IMAGING SYSTEM FOR EVALUATING THE CURL OF A KERATINOUS SUBSTRATE

BACKGROUND

The present disclosure describes an automated imaging system for evaluating the curl of a keratinous substrate.

SUMMARY

In an embodiment, a system is provided for evaluating a curl of at least one eyelash sample that includes a plurality of fibers, comprising: a platform configured to receive a sample of the eyelash sample; an image capturing device configured to capture profile image of the eyelash sample; and a processing system configured to receive the profile image and evaluate at least one feature related to a curl of one or more of the fibers of at least one eyelash sample.

In an embodiment, the at least one feature includes an average angle of the fibers of the at least one eyelash sample.

In an embodiment, the at least one feature includes a maximum angle among the fibers of the at least one eyelash sample.

In an embodiment, the at least one feature includes a minimum angle among the fibers of the at least one eyelash sample.

In an embodiment, the system further includes an image capturing device configured to capture an overhead image of the eyelash sample, and the processing system is configured to receive the overhead image and evaluate a shape of the eyelash sample.

In an embodiment, the system determines a location of the fibers in the captured profile image based on detecting pixels of a predetermined color in the captured profile image.

In an embodiment, the captured profile image is cropped to a predetermined region prior to detecting the pixels of the predetermined color.

In an embodiment, the predetermined region is a region having pixels darker than a predefined threshold.

In an embodiment, the predefined threshold and the predetermined region are adjusted based on results of profile images of eyelash samples previously evaluated by the system.

In an embodiment, the at least one feature related to a curl of one or more of the fiber is detected in the profile image based on a machine learning algorithm that compares characteristics of the profile image to image features on a plurality of other profile images of other eyelash samples.

In an embodiment, an average angle of the fibers is determined based on performing linear regression based on detected pixels corresponding to the fibers in the image.

In an embodiment, a method is provided implemented by a system for evaluating a curl of at least one eyelash sample that includes a plurality of fibers, comprising: capturing, via an image capturing device, a profile image of the eyelash sample; and evaluating, via a processing system, at least one feature related to a curl or angle of one or more of the fibers of the at least one eyelash sample.

In an embodiment, a method if provided of evaluating a transferability at least one eyelash sample that includes a plurality of fibers, comprising: immersing the at least one eyelash sample in a predetermined solution, the at least one eyelash sample being exposed to mascara; contacting the at least one eyelash to a surface; capturing an image of the surface; and determining an amount of mascara that has transferred to the surface based on an darkness intensity detected in the captured image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the disclosed embodiments and many of the attendant advantages thereof will be readily obtained as the same becomes better understood by reference to the following detailed description when considered in connection with the accompanying drawings, wherein:

FIGS. 1A-1B show a system for automatically imaging an eyelash according to an embodiment.

FIGS. 6A-6B shows a system 600 configured to test the smudgability of the fake eyelashes according to an embodiment.

DESCRIPTION

The present embodiments are directed to a device and application directed to auto-detecting the position of fibers (keratinous or of other materials) from an image. In an example, the keratinous substrate is an eyelash, real or synthetic. An objective achieved by the present embodiments is to accurately and efficiently evaluate the angle and curl of the fibers of multiple eyelash samples, which can be useful in determining the effect of product (such as mascara) which are applied to the eyelash. With conventional means, such an evaluation would be inaccurate and time-consuming.

In one aspect, image analysis is used for each image of a sample to achieve the above-described objectives. In an another aspect, the application uses machine learning techniques to analyze multiple learning images and generate fiber information associated with a specific image.

Figure 1A:
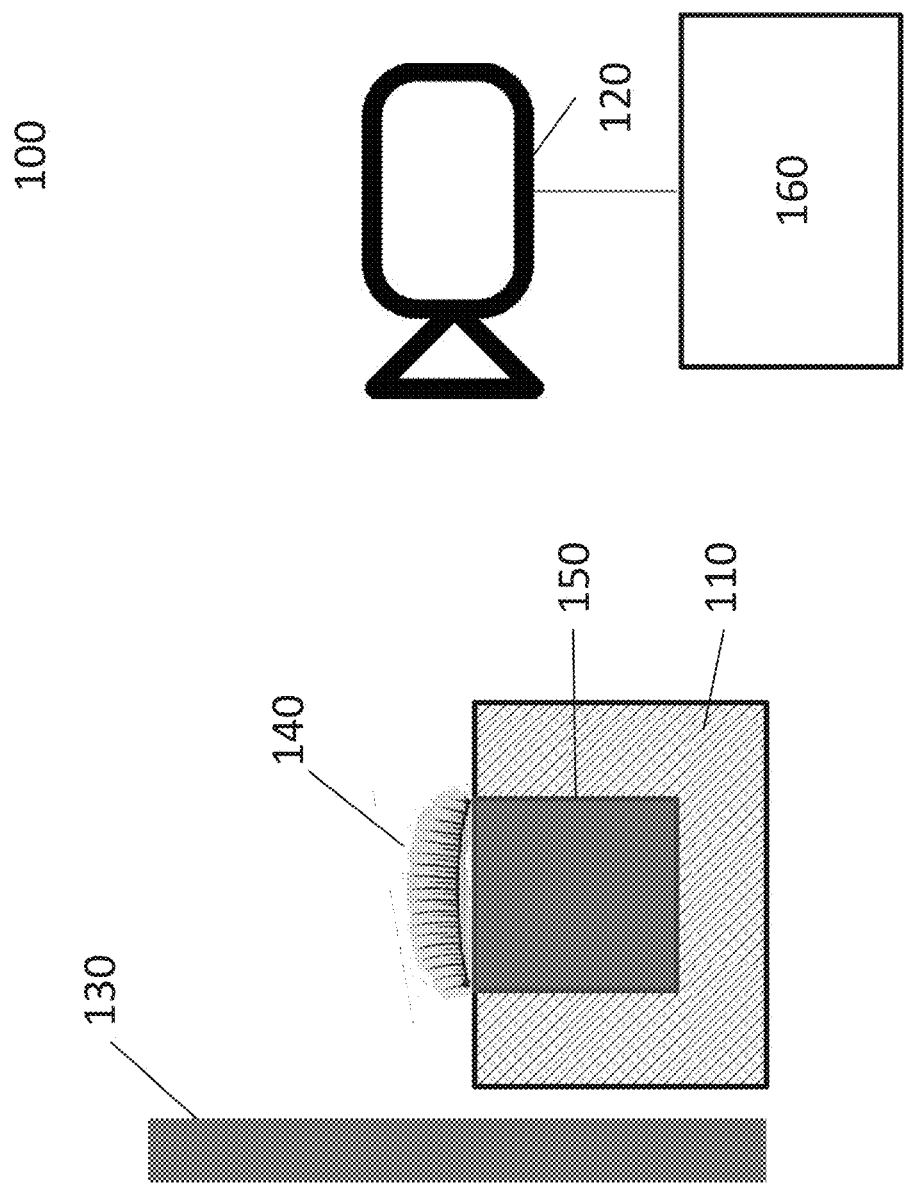

FIG. 1A shows an overhead view of a system 100 for automatically imaging an eyelash (for example). The system includes a platform/stage 110, an image capturing device 120, and a background surface 130. Disposed on the platform/stage is a sample 140. The sample 140 may be a synthetic eyelash that attached to a holding member 150. The sample is placed at a side profile angle with respect to the image capturing device and the background surface 130. The image capturing device may be connected to a processing system 160 which will perform analysis on the images captured by the image capturing device 120. The processing system will be described in more detail below.

FIG. 1B shows an optional second configuration of the system 100, in which the image capturing device 120 is arranged to take an overhead image of the eyelash sample 140. In this arrangement, an evaluation of the sample shape may be readily obtained as will be discussed below. FIG. 1B may include an additional image capturing device to the camera shown in FIG. 1A. Alternatively, it may be the same image capturing device but shifted to the second position. Alternatively, the platform 110 may be configured to be moved to create the arrangement show in FIG. 1B.

Figure 2:
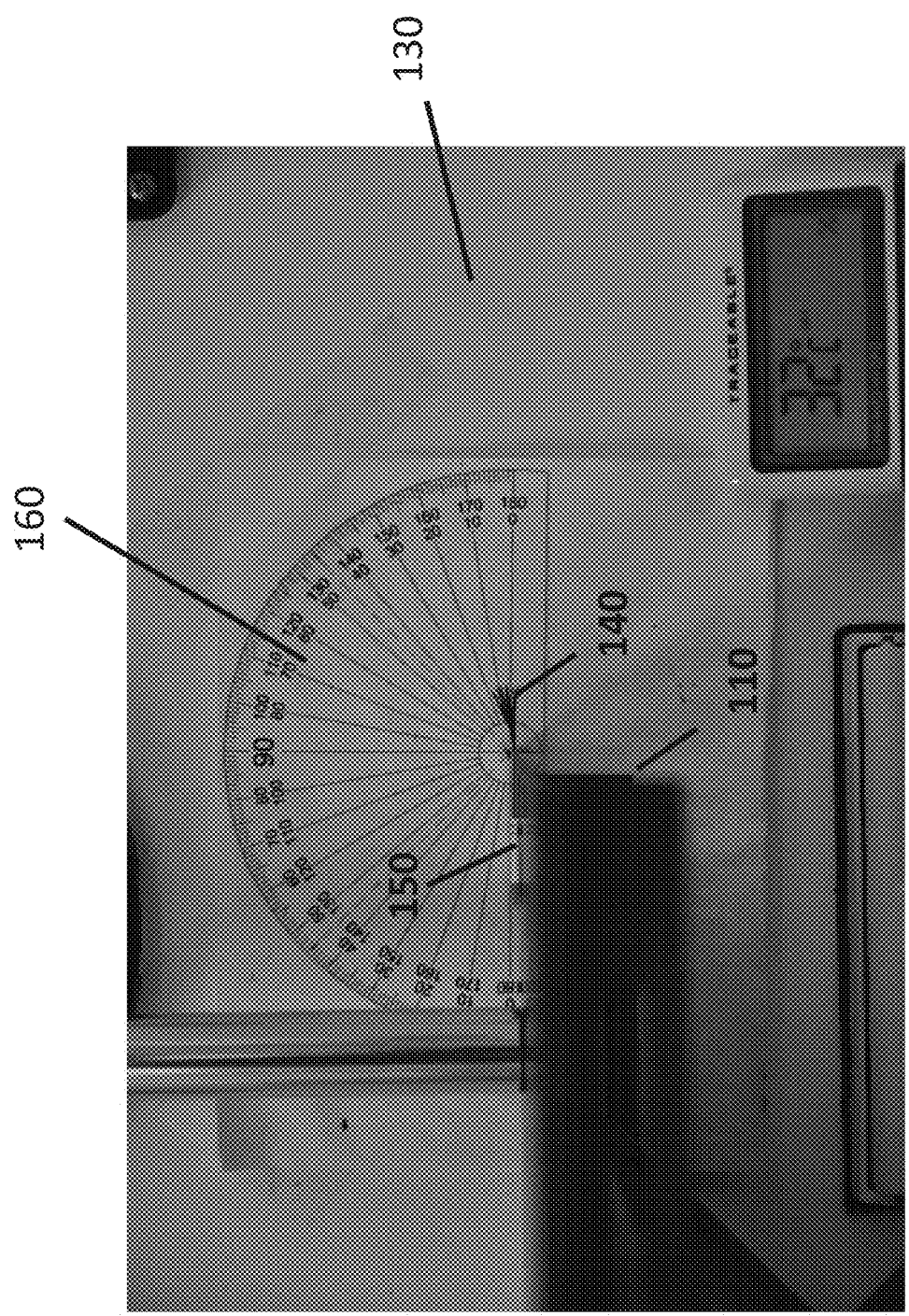
FIG. 2 shows a testing configuration of a system according to an embodiment.

FIG. 2 shows a photograph of a testing configuration of a system similar the above-described embodiment, the photograph being taken from the point of view of the image capturing device, where the platform/stage 110, the sample 140, the holding member 150, and the background surface 130 are shown. FIG. 2 also shows a protractor 160 attached to the background surface to illustrate the types of angles that the fibers on the sample make with respect to a horizontal plane. The protractor is not essential for the present embodiments.

In a method according to an embodiment, a plurality of different samples are imaged based on the setup shown in FIGS. 1 and 2, and a separate image is captured of each separate sample. In particular the fibers of the sample are imaged for analysis of their shape or other characteristics.

The system automatically generates the aggregated statistics for a series of images that can represent different time points of the same product or multiple products with different treatments of interest. Furthermore, the system automatically detects handwritten or digitized characters in the image that provide meaningful information about the image, which can be used to organize the data (such as automatically applying to the file name) and identify properties of a sample in a particular image (such as eyelash type, color, or product applied to the sample).

Figure 3:
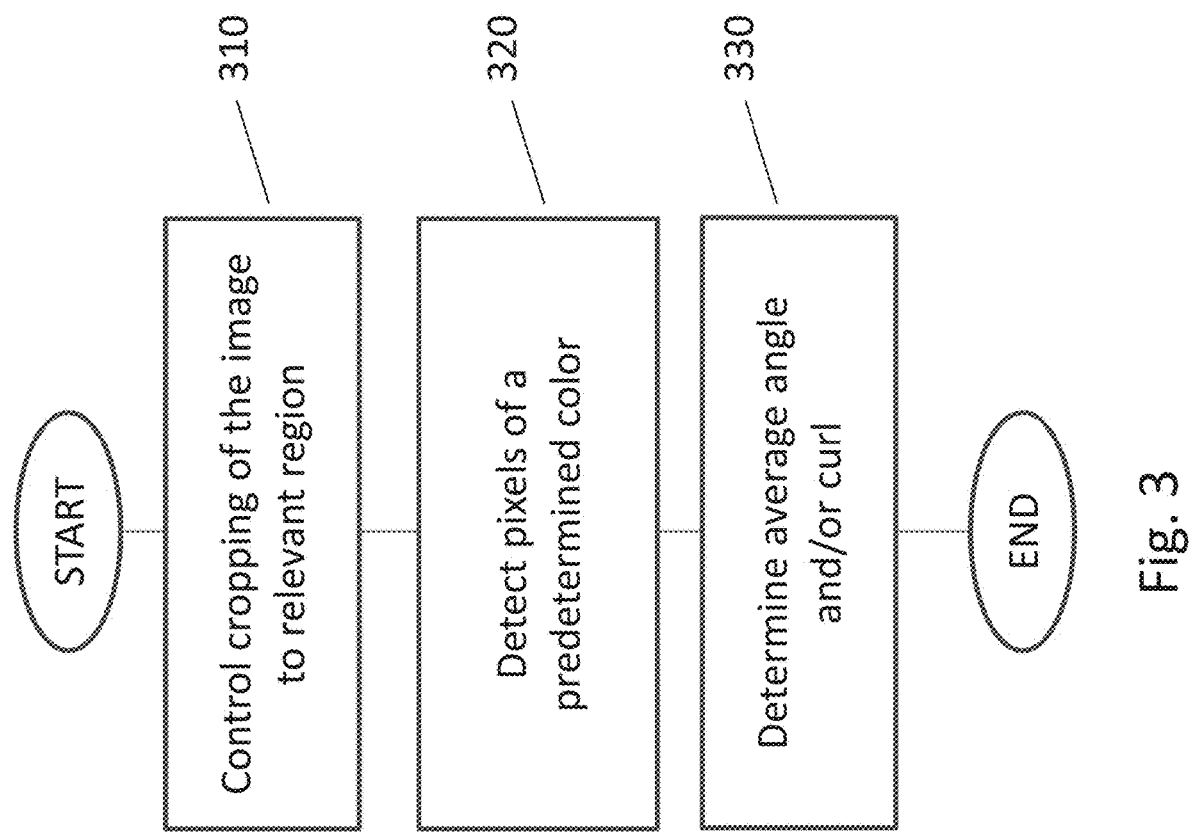
FIG. 3 shows an algorithm that is performed on the imaged samples by the system according to an embodiment.

An exemplary algorithm 300 that is performed on the imaged samples is described below with reference to FIG. 3.

First, in step 310, the application takes the image of the lash and crops the image to the relevant region. This can be performed based on a predetermined coordinate area in which it is known that the image of the sample will be located (such as a centered portion of the image).

In an embodiment, only the fibers in the sample will have a certain color, such as black. Thus, the pixels of the certain color are detected (step 320) and the average curl is plotted on a 2D scatter plot. To facilitate this step, the white balance image may be optimized such that the white balance of the picture to facilitate the detection black versus white contrast. The system can also automatically detect the percentage of black versus white within the white background.

The average angle and curl of the fibers in the sample is measured using linear regression (step 330). Specifically, the pixels in the "expected maximum" region are labelled in red and fit with polynomial (degree=2) regression. Using a couple heuristics for which side of the parabola to pick, it measures from one of the tips of the parabola to the base. The heuristics are based on which side of the parabola has more data points and the concavity of the curve.

In one aspect, the error may be minimized through random searches and grid searches to train the software to optimize color detection for the eyelashes and the bounds of the expected search space. Doing this training acts to increase the accuracy of the software and act as a noise filter of other dark particles.

Figure 4:
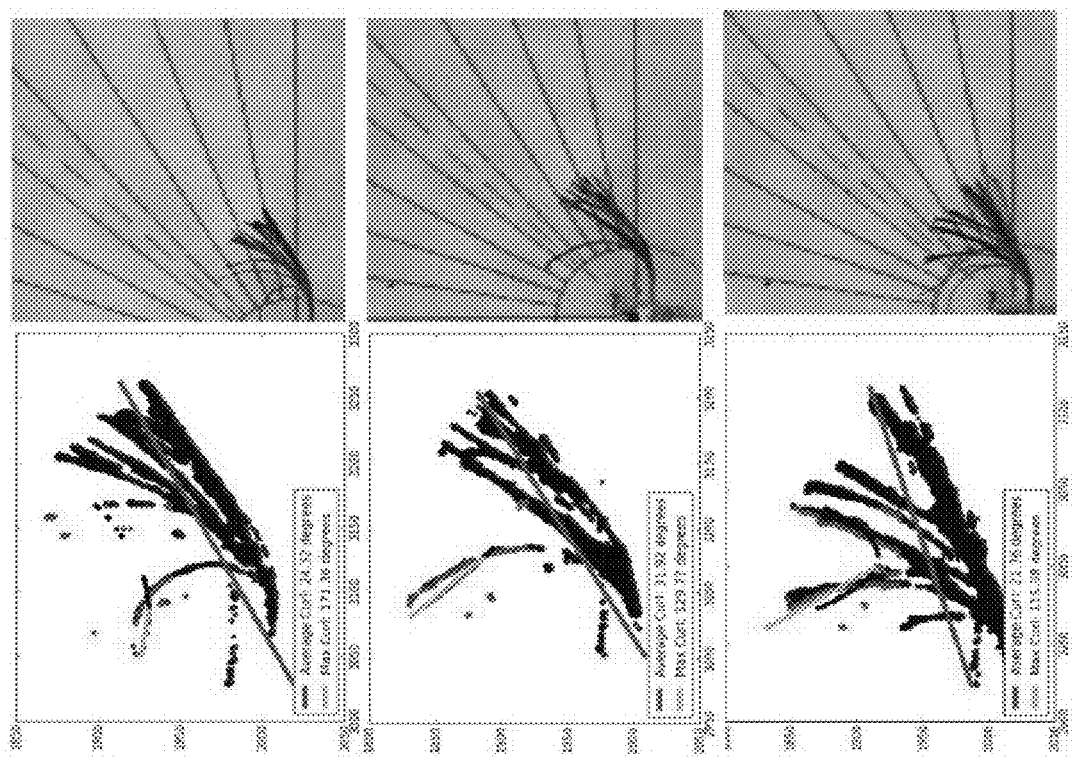
FIG. 4 shows different examples of image analysis of being performed according to an embodiment.

FIG. 4 shows different examples of image analysis of being performed according to the above description. On the left of each sample is the plot of the detected lashes with corresponding curve fitting and visualized calculations. On the right is the cropped image of the eyelash from the side for reference. The black/blue data points are detected eyelashes, the green line is the average of those eyelashes, the red data points are the "maximum curl" eyelashes, and the cyan line is the best fit of the maximum curl data points. The average angle for all of the eyelashes is calculated via linear regression. The maximum curl angle is calculated using polynomial regression with a degree of 2 and finding the maximum angle detected on the more heavily weighted side of the fit curve.

It can be seen that with the above data identified in the sample plots, the following items can be automatically determined.

1. The angle with respect to the area of reference.
2. Minimum angle to reference
3. Maximum angle to reference
4. Standard deviation of the number of fibers
5. Average of the angles in respect to number of fibers
6. Overall shape of the lashes
7. the curl angle with respect to the area of reference.
8. Minimum curl angle to reference
9. Maximum curl angle to reference The performance of the algorithm depends on three variables, lash pixel detection, lash location boundaries, and curve fit of the maximum curl portion.

In an embodiment, execution of the algorithm results in analysis of a predefined search space for pixels darker than a predefined threshold. To take advantage of the optimization properties of machine learning, both the lash pixel color and the bounds of the search space can be further refined. Utilizing reinforcement learning to adjust the sought after pixel color, the maximum number of pixels can be incentivized with a high penalty for deviating from the original angle value. This pixel color optimization will act as a noise filter and speed up the processing time and the fit of the maximum curl curve.

The search bounds can be adjusted to minimize the total search space in accordance to each adjusted pixel color. In this case, the incentive would be to capture all previously detected pixels, while receiving a penalty for the area of the search space. After training the algorithm, it will perform with the optimized search space and pixel detection, reducing the processing time and creating a more robust algorithm.

Figure 5B:
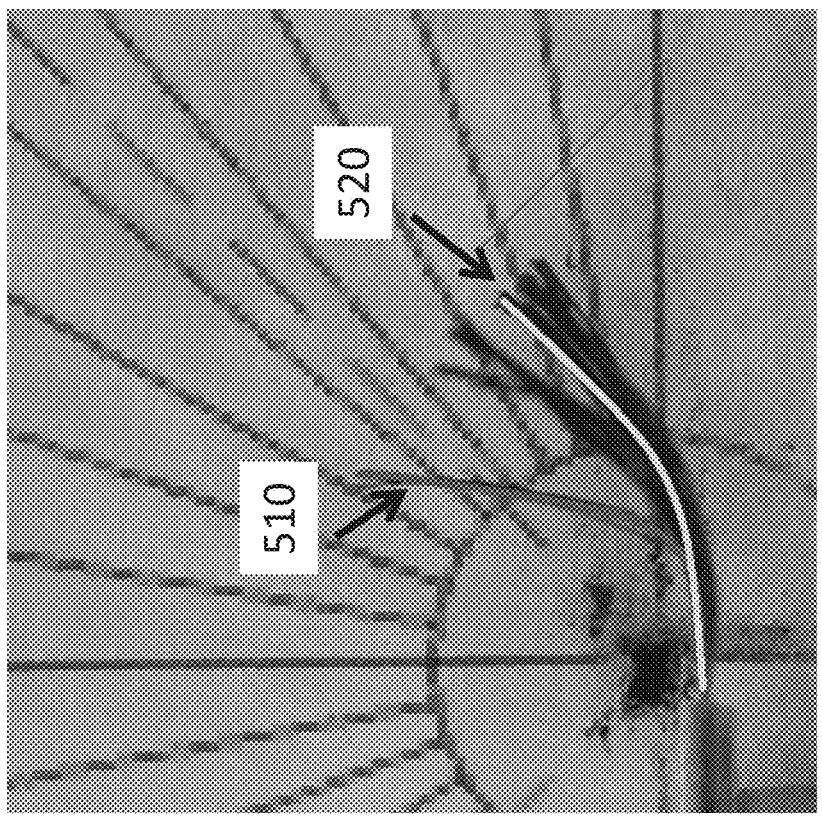
FIG. 5A-5B show an example of the training data that is generated according to an embodiment.
Figure 5A:
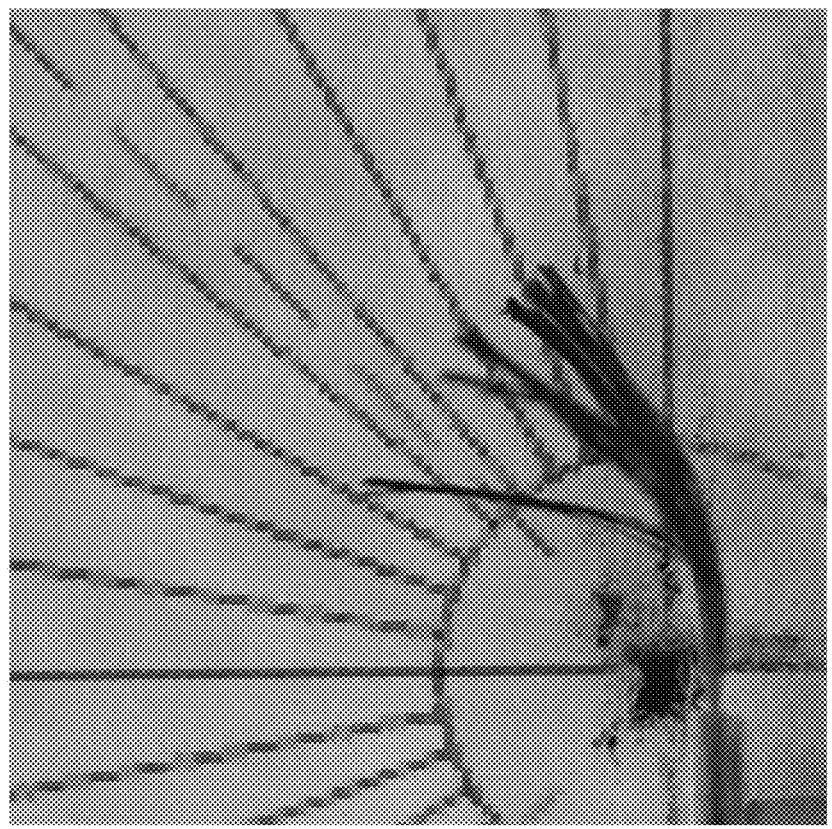

In an another embodiment, the algorithm is implemented via a neural net with multiple hidden layers, otherwise known as "deep learning." Training data could consist of lash images with the average and maximum curl lines being labelled with the corresponding angle. Through this method, a precise algorithm is realized to measure the average and maximum curl angle. The algorithm in this embodiment requires a sufficiently large volume of training data to be generated in order for the algorithm to generate accurate heuristics. FIG. 5A-5B shows an example of the training data that is generated under this approach. FIG. 5A is a representation of an image generated using the system described above. FIG. 5B shows the detected maximum curl angle 510 and the average curl angle 520 labeled in the image.

Implementing the deep learning technique would be understood a person of ordinary skill in the art. Such a technique is described in U.S. Pat. Nos. 8,442,321, 9,015,083, 9,536,293, 9,324,022, and U.S. PG Publication No.

2014/0376819 A1, which are incorporated herein by reference. For instance, the in deep learning models, systems learn to recognize objects that are important, without the user telling the system explicitly what that object is ahead of time. Therefore, in the present embodiments, the system an utilize a deep learning network to learn to recognize the traits of the fibers of the eyelash in the image. For example, if an image search is performed to find sample images with similar traits to a reference sample image (such as a reference image with a very high curl angle), then a system that has utilized a deep learning network can return search well-filtered search results based on learning what traits a fiber with a high curl angle in an image especially when compared to fibers with an average or low curl angle.

FIGS. 6A-6B shows a system 600 configured to test the smudgability of the fake eyelashes. The system in FIG. 6 includes a propeller mixer that includes a driving unit 610 and a rotating arm 620. Attached to rotating arm is a fake eyelash sample 630 (which may be mounted on a substrate). Each of the mascara compositions were applied on fake eyelashes and then submerged into artificial sebum (oleic acid based oil) or water for 24 hours. The fake eyelashes were then brushed on water color papers 640 (192 g/m2, acid free) 10 times to see if the mascara pigment transfers from the fake eyelashes to the water color paper. The brushing was regulated by rotation of the rotating arm 620 at a predetermined rate (such as 12 rpm). FIG. 6B shows a side view of the rotation effected by the rotating arm 620 and a point when the sample 630 contacts the water color paper 640.

Figure 7:
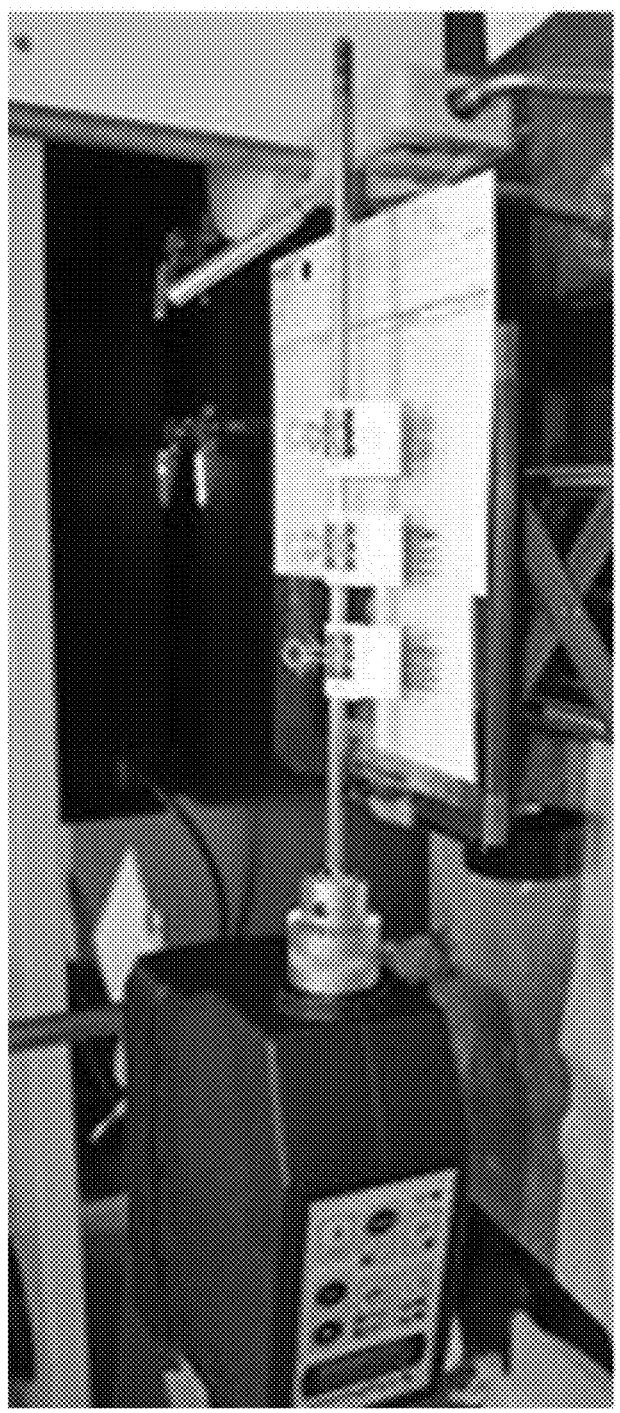
FIG. 7 shows a testing configuration of a system configured to test the smudgability of the fake eyelashes according to an embodiment.

FIG. 7 shows a photograph of a testing configuration of a system similar to the above-described embodiment in FIG. 5

Figure 8:
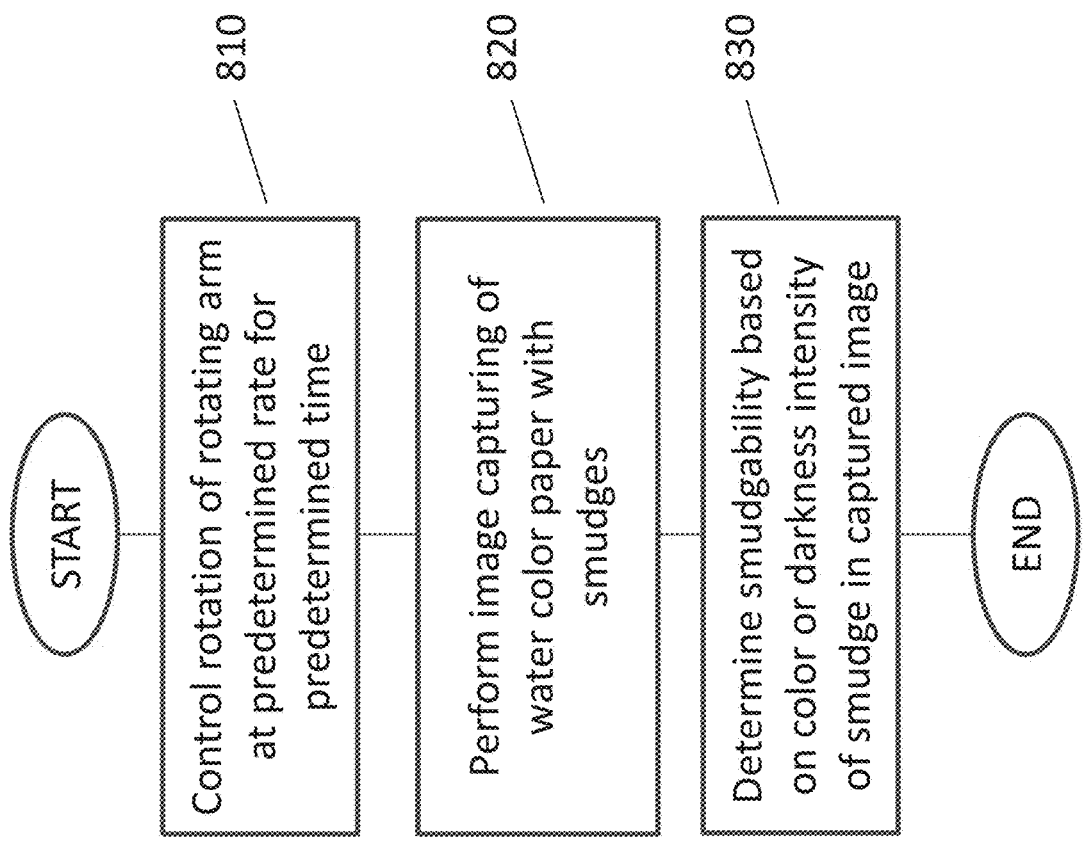
FIG. 8 show a method for testing the smudgability of the fake eyelashes according to an embodiment.

FIG. 8 show a method for testing the smudgability of the fake eyelashes which employs the system of FIG. 6 or 7. In step 810, the driving unit 810 is controlled to rotate the rotating arm at the predetermined rate (for example, 12 rpm) for a predetermined time (for example, 1 minute). In step 820, after the water color paper has dried, image capturing is performed on the water color paper which has the smudges from the sample. In step 830, the amount of smudging that has occurred is determined based on a color or darkness intensity measured in the captured image. This intensity can be measured based on many methods understood in the art, such as measuring the pixel values in the image where the smudging has occurred.

Figure 9:
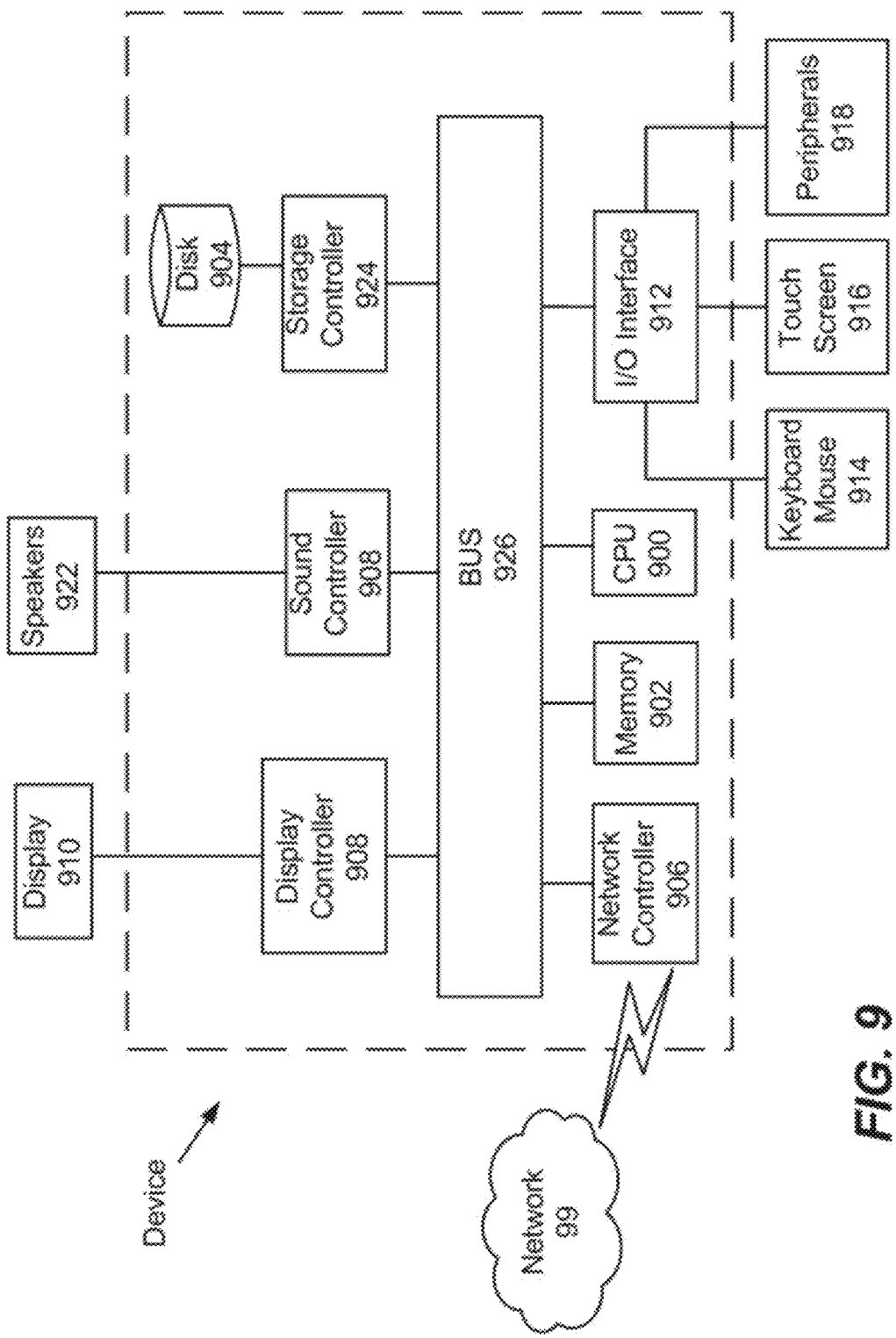
FIG. 9 shows a processing system according to certain embodiments.

FIG. 9 is a more detailed block diagram illustrating a processing system 110 according to certain embodiments of the present disclosure. In FIG. 9, the system includes a CPU X00 which performs the processes described above/b Next, a hardware description of the system according to exemplary embodiments is described with reference to FIG. 9. In FIG. 9, the system includes a CPU 900 which performs the processes described above/below. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the system communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

The hardware elements in order to achieve the system may be realized by various circuitry elements, known to those skilled in the art. For example, CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU X00 may be implemented as multiple processors cooperatively working in parallel to perform the instructions of the inventive processes described above.

The system in FIG. 9 also includes a network controller 906, such as an Intel Ethernet PRO network interface card from Intel Corporation of America, for interfacing with network 99. As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G and 4G wireless cellular systems. The wireless network can also be WiFi, Bluetooth, or any other wireless form of communication that is known.

The system further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display X10. General purpose I/O interface also connects to a variety of peripherals 918 including printers and scanners, such as an OfficeJet or DeskJet from Hewlett Packard.

A sound controller 920 is also provided in the system, such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the system. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
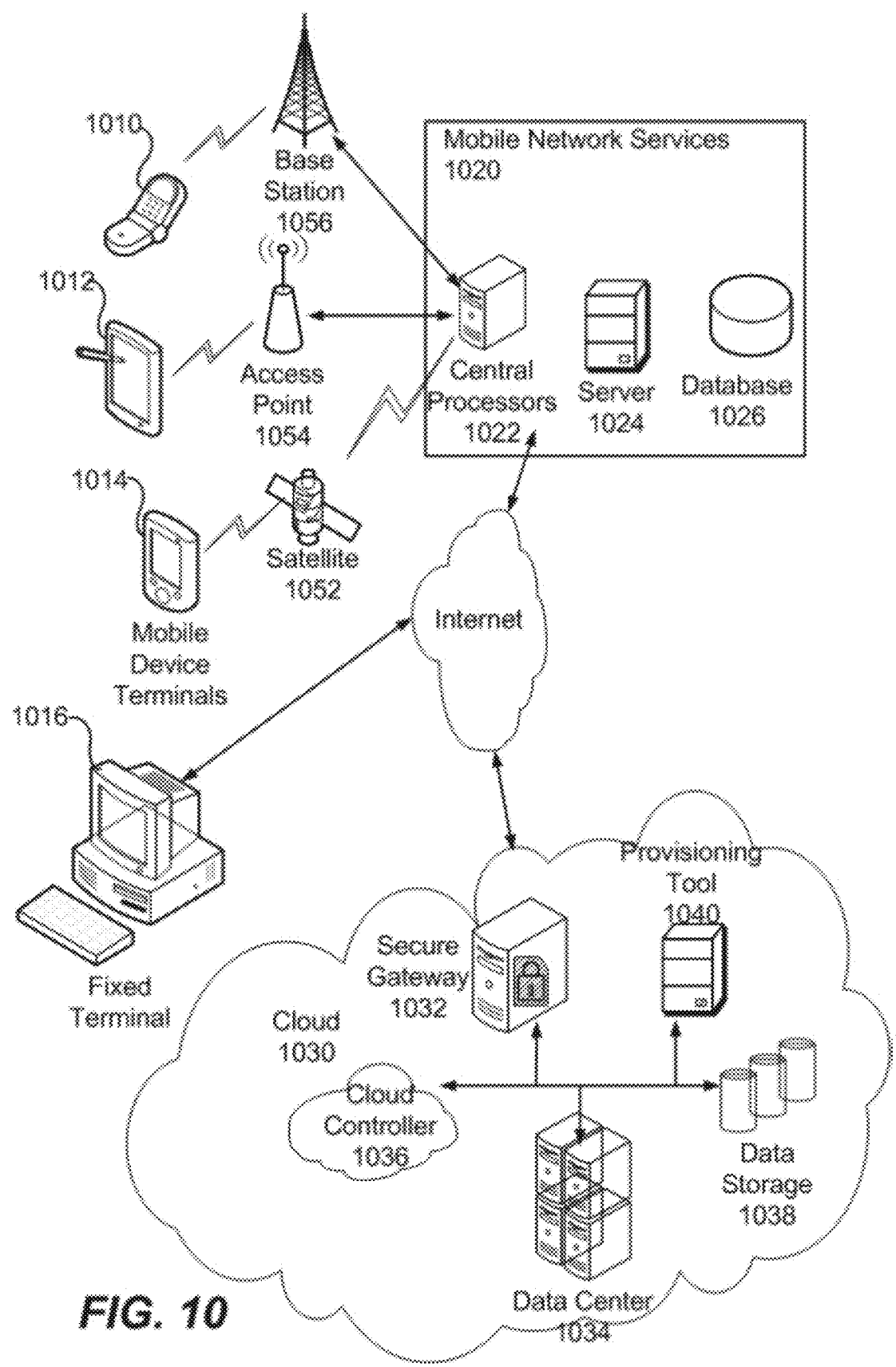
FIG. 10 shows distributed components of a system according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

What is claimed is:

1. A system for evaluating a curl of at least one eyelash sample that includes a plurality of fibers, comprising:
    a platform configured to receive a sample of the eyelash sample, which is a synthetic eyelash sample that has a cosmetic product applied to the eyelash sample, the platform including a holding member configured to hold the eyelash sample at an end of the eyelash sample opposite to the plurality of fibers;
    a first image capturing device configured to capture a profile image of the eyelash sample;
    a second image capturing device configured to capture an overhead image of the eyelash sample,
    and
    a processing system configured to receive the profile image and evaluate at least one feature related to a curl of one or more of the fibers of at least one eyelash sample that has the cosmetic product applied thereto, and the processing system is configured to receive the overhead image and evaluate a shape of the eyelash sample.

2. The system according to claim 1, wherein the at least one feature includes an average angle of the fibers of the at least one eyelash sample.

3. The system according to claim 1, wherein the at least one feature includes a maximum angle among the fibers of the at least one eyelash sample.

4. The system according to claim 1, wherein the at least one feature includes a minimum angle among the fibers of the at least one eyelash sample.

5. The system according to claim 1, further comprising a background surface placed opposite to the first image capturing device such that the holding member is between the first image capturing device and the background surface, the background surface including a protractor that displays a plurality of lines at different angles with respect to a horizontal plane.

6. The system according to claim 1, wherein the system determines a location of the fibers in the captured profile image based on detecting pixels of a predetermined color in the captured profile image.

7. The system according to claim 6, wherein the captured profile image is cropped to a predetermined region prior to detecting the pixels of the predetermined color.

8. The system according to claim 7, wherein the predetermined region is a region having pixels darker than a predefined threshold.

9. The system according to claim 8, wherein the predefined threshold and the predetermined region are adjusted based on results of profile images of eyelash samples previously evaluated by the system.

10. The system according to claim 1, wherein the at least one feature related to a curl of one or more of the fiber is detected in the profile image based on a machine learning algorithm that compares characteristics of the profile image to image features on a plurality of other profile images of other eyelash samples.

11. The system according to claim 1, wherein an average angle of the fibers is determined based on performing linear regression based on detected pixels corresponding to the fibers in the image.

12. A method implemented by a system for evaluating a curl of at least one eyelash sample that includes a plurality of fibers, comprising:
    capturing, via a first image capturing device, a profile image of the eyelash sample, the system including a platform configured to receive the eyelash sample, which is a synthetic eyelash sample that has a cosmetic product applied to the eyelash sample, the platform including a holding member configured to hold the eyelash sample at an end of the eyelash sample opposite to the plurality of fibers;
    capturing, via a second image capturing device, an overhead image of the eyelash sample, and
    receiving, via a processing system, the profile image and evaluating at least one feature related to a curl or angle of one or more of the fibers of the at least one eyelash sample that has the cosmetic product applied thereto; and
    receiving, via the processing system, the overhead image and evaluating a shape of the eyelash sample.

* * * * *